United States Patent [19]

Ikegami et al.

[11] Patent Number: 5,708,254
[45] Date of Patent: Jan. 13, 1998

[54] ENGINE DRIVEN ARC WELDER

[75] Inventors: Hideki Ikegami; Toru Hiroi, both of Kawagoe, Japan

[73] Assignee: Denyo Kabushiki Kaisha, Tokyo, Japan

[21] Appl. No.: 798,928

[22] Filed: Feb. 11, 1997

Related U.S. Application Data

[62] Division of Ser. No. 325,097, Oct. 17, 1994, Pat. No. 5,637,246.

[30] Foreign Application Priority Data

Oct. 18, 1993 [JP] Japan .................. 5-259578
Dec. 28, 1993 [JP] Japan .................. 5-70632

[51] Int. Cl.$^6$ .................................................. B23K 9/10
[52] U.S. Cl. ........................................ 219/133; 219/130.21
[58] Field of Search ............................ 219/133, 130.21, 219/130.33, 134, 137 PS

[56] References Cited

U.S. PATENT DOCUMENTS

| | | | |
|---|---|---|---|
| 2,458,658 | 1/1949 | Tymer | 219/130.33 |
| 4,952,774 | 8/1990 | Sugimoto et al. | 219/133 |
| 5,093,611 | 3/1992 | Nakamura et al. | |
| 5,250,786 | 10/1993 | Kikuchi et al. | 219/133 |

FOREIGN PATENT DOCUMENTS

| | | |
|---|---|---|
| 536397 | 1/1991 | European Pat. Off. |
| 3-49802 | 5/1991 | Japan . |
| 4-35007 | 3/1992 | Japan . |
| 5-185226 | 7/1993 | Japan . |
| 2 064 891 | 11/1979 | United Kingdom . |

*Primary Examiner*—Clifford C. Shaw
*Attorney, Agent, or Firm*—Jacobson, Price, Holman & Stern, PLLC

[57] ABSTRACT

There is provided an engine driven arc welder adapted for converting a.c. output of welding generator into d.c. output to allow it to undergo switching control by using a switching circuit to detect an output of the switching circuit to control its ON/OFF period by the detected content to control a welding current. The engine driven arc welder has a load limiting function. In this case, AVR is employed in a feedback control loop for generator voltage. The circuit configuration includes a F/V characteristic circuit and an output suppression circuit for comparing a detected voltage of the welding generator with a predetermined reference voltage to deliver, when the detected voltage is lower than the reference voltage, a signal for suppressing a welding output to a constant current control circuit for controlling welding current so that it becomes equal to a fixed value.

3 Claims, 7 Drawing Sheets

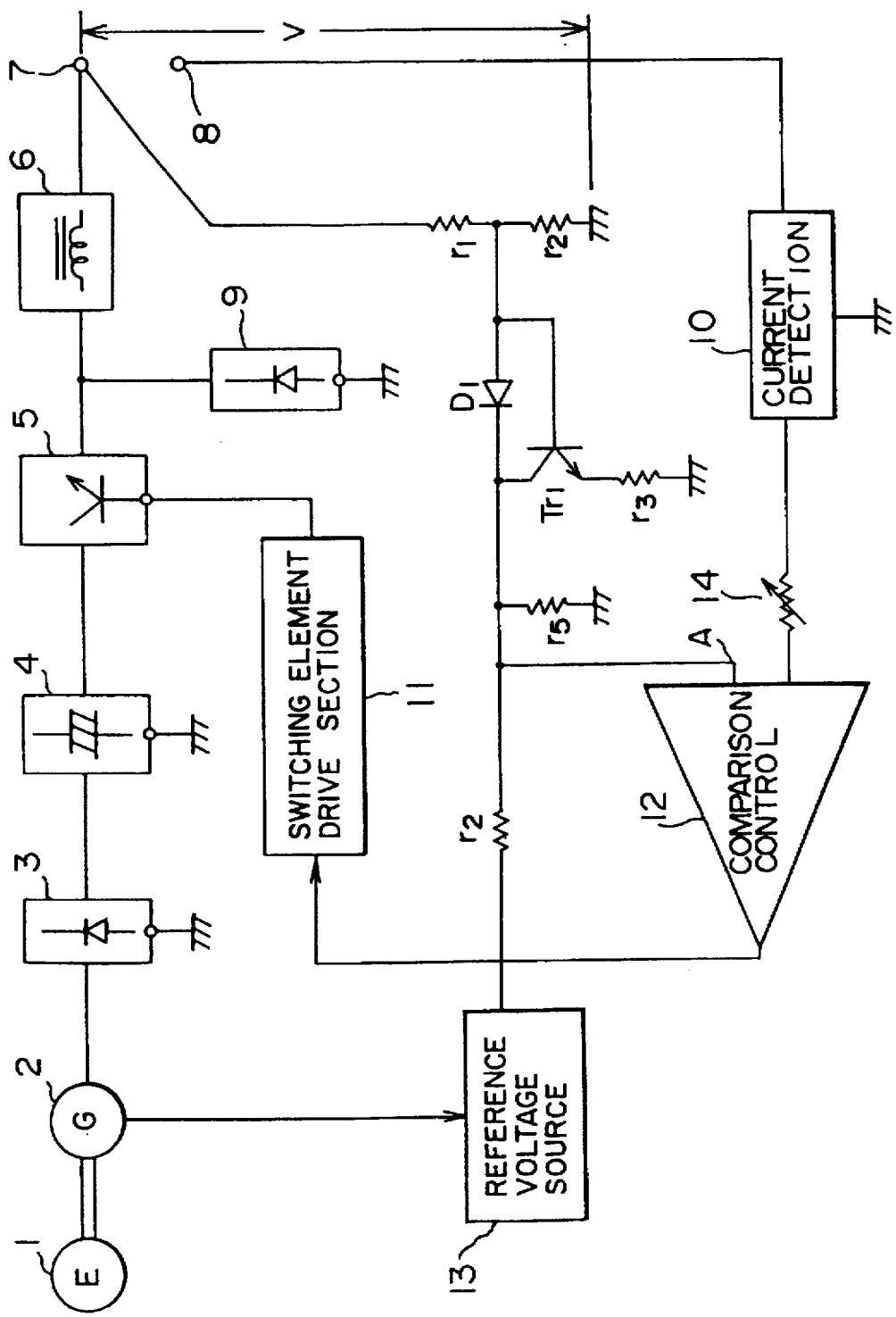
F I G. 1

ENGINE DRIVEN ARC WELDER

This is a Divisional of application Ser. No. 08/325,097 filed Oct. 17, 1994 now U.S. Pat. No. 5,637,246.

BACKGROUND OF THE INVENTION

1. Field of the Invention

This invention relates to an engine driven arc welder or welding machine in which the external output characteristic is caused to have constant current characteristic.

2. Description of the Prior Art

Hitherto, in welding work by engine driven arc welders used in outdoor construction works, manual welding is the main current. In view of this, there has been conventionally proposed a system in which power supply of constant current characteristic having high stability of arc is applied to the outdoor engine driven arc welder. The circuit configuration of the conventional system is shown in FIG. 10. In the system of FIG. 10, a chopper circuit for providing general constant current characteristic is constituted. Namely, an output from generator 32 connected to engine 31 is rectified by rectifier 33 and is then smoothed by smoothing capacitor 34 so that it is caused to be power having lower impedance even when high speed operation of transistor is carried out. Switching transistor 35 carries out ON/OFF operation of power thus obtained at higher frequency and by large current. Reactor 36 suppresses sudden increase or decrease of current and smoothes output caused to undergo switching by switching transistor 35, thus to stabilize the welding condition. In FIG. 10, reference numerals 37, 38 denote welding terminals, reference numeral 39 denotes a current detector, reference numeral 40 denotes a constant current control section, and reference numeral 41 denotes a transistor drive section for driving switching transistor 35.

However, with such welder of constant current characteristics, in the case where high cellulose covered or coated welding rod for which large short-circuit current is required is used, there was the problem that deposition is apt to take place, giving rise to welding defect.

As a method of increasing current at the time of short-circuit of welding, the apparatus described in Jikkohei No. 4-35007 (Japanese Utility Model Publication No. 35007/1992) has been proposed. In accordance with the apparatus abovementioned, within current control circuit using thyristor, a detected value of arc current detecting circuit is delivered to current setting circuit to carry out adjustment of detection level to compare that detected value with reference value at firing circuit via output characteristic switching circuit thus to carry out phase control. The technology of the apparatus contemplates suddenly increasing current at the time of short-circuit. Further, there is proposed, in the Tokkaihei No. 5-185226 (Japanese Patent Application Laid Open No. 185226/1993), the technology in which direct current (d.c.) in d.c. arc welder is converted into high frequency alternate current (a.c.) to carry out constant current welding by means of an output transformer for controlling the high frequency a.c. so that it becomes equal to an output voltage necessary for welding and output side rectifier of diode bridge configuration for rectifying this output to set a welding current to switch over characteristics by the operation of changeover switch based on lowering of voltage due to occurrence of short-circuit during welding.

In the case of the above-mentioned high cellulose system covered welding rod used outdoor, since welding is carried out in the state where the arc length is caused to be very short, there results no complete short-circuited state unless the welder has drooping characteristic. When current is suddenly increased only resulting from the fact that voltage is lowered to some extent, uniform welding state cannot be provided. This was insufficient.

Particularly, in the engine driven arc welder, unlike the above-mentioned d.c. arc welder, high frequency a.c. inverter, output transformer of high frequency a.c., and the like are not required.

In addition, in the case of the high cellulose system covered welder used in Europe or U.S.A., the above-mentioned problems were further conspicuous.

Moreover, when constant current output characteristic having high arc stability is employed in the engine driven arc welder, in the case where voltage drop of welding cable becomes large in dependency upon choice of operator in the vicinity where maximum current output is set, or in the case where long arc length is adopted in dependency upon kind of covered rods, welding output voltage is increased. For this reason, there are employed generator and semiconductor having capacity capable of providing full output of the maximum output curve in the constant current output characteristic and engine of large output capable of driving such generator. Alternatively, there is employed the technology described in the Jikkohei No. 3-49802 (Japanese Utility Model Publication No. 49802/1991) as the technology in which slanting portion which is the overload region of FIG. 6 is not caused to be outputted. In accordance with this technology, since welder is used in the state connected to commercial power supply, it is possible to prepare load characteristic in a stationary manner, and power supply is also stable. Namely, this welder is designed on the premise of substantially the fixed condition.

However, in the case where the above-mentioned technology is utilized for engine driven arc welder used at outdoor place where no commercial power supply is installed, since its output characteristic is always set in a stationary manner, welding output would exceed required engine output unless an engine having margin in output is employed because of lowering of engine output due to change of weather condition, aged deterioration, etc. and unevenness of engine output. As a result, the engine rotation number would become extremely lower, so welding output becomes unstable. This might cause occurrence of welding defect, deterioration of the engine by overload of the engine, production of a great quantity of black smoke and lowering of the life time due to deterioration of cooling efficiency of welding generator.

SUMMARY OF THE INVENTION

An object of this invention is to provide an engine driven arc welder having stability of arc of constant current characteristic, and suitable for welding where arc length of high cellulose covered welding rod, etc. is shortened.

Another object of this invention is to provide an engine driven arc welder having constant current characteristic, which is permitted to limit welding output to prevent overload in such a case that welding output is placed in overload state by the welding work condition.

To achieve the above-mentioned object, in accordance with this invention, there is provided an engine driven arc welder comprising a welding generator driven by the engine to form an a.c. output, a rectifying circuit for converting the a.c. output of the generator into a d.c., and a switching circuit for allowing an output of the rectifying circuit to undergo switching control to output a switching-controlled output, thus to detect an output of the switching circuit to deliver a control signal to the switching circuit in dependency upon the detected content to control ON/OFF period to control an output current delivered to welding terminals, characterized by the provision of a current detecting circuit for detecting an output current delivered to the welding terminals, a voltage detecting circuit for detecting a voltage across the welding terminals, and a reference signal formation circuit such that when a detected voltage of the voltage detecting circuit is higher than a first predetermined value, it has a first reference value, when that detected voltage is lower than a second predetermined value, it has a second reference value higher than the first reference value, and when that detected voltage is between the first and second predetermined values, it has a reference value of a drooping characteristic continuously connecting the first reference value and the second reference value, thus to compare a detected signal of the current detecting circuit with any reference signal of the reference signal formation circuit to control the switching circuit, and an engine driven arc welder comprising a welding generator driven by the engine to form an a.c. output, an automatic voltage regulating circuit for regulating an a.c. output voltage of the welding generator so that it becomes equal to a fixed value, a rectifying circuit for converting the a.c. output of the welding generator into a d.c., switching circuit for allowing the d.c. outputted from the rectifying circuit to undergo switching control to output a switching-controlled output to welding terminals, a welding current detector for detecting an output current of the switching circuit, and a constant current control circuit for applying a control signal to the switching circuit in response to the detected current of the welding current detector to control the ON-period thereof so that it becomes equal to a fixed value, characterized by the provision of a frequency detecting circuit for detecting a frequency of an a.c. output of the welding generator, a frequency-voltage characteristic circuit for controlling the welding generator so as to output a voltage of a fixed value when the detected frequency of the frequency detecting circuit is a predetermined value or more, and a voltage of a value proportional to frequency when that detected frequency is less than the predetermined value, a voltage detecting circuit for detecting an output voltage of the welding generator, and an output suppression circuit for comparing the detected voltage of the voltage detection circuit with a reference voltage set in advance to deliver a signal to suppress a welding output to the constant current control circuit when the detected voltage is lower than the reference voltage, thus to carry out switching control of the switching circuit by an output of the output suppression circuit.

BRIEF DESCRIPTION OF THE DRAWINGS

In the accompanying drawings:

FIG. 1 is a circuit diagram showing the configuration of a first embodiment according to this invention in a manner combined with block diagram.

DESCRIPTION OF THE PREFERRED EMBODIMENTS

Figure 2:
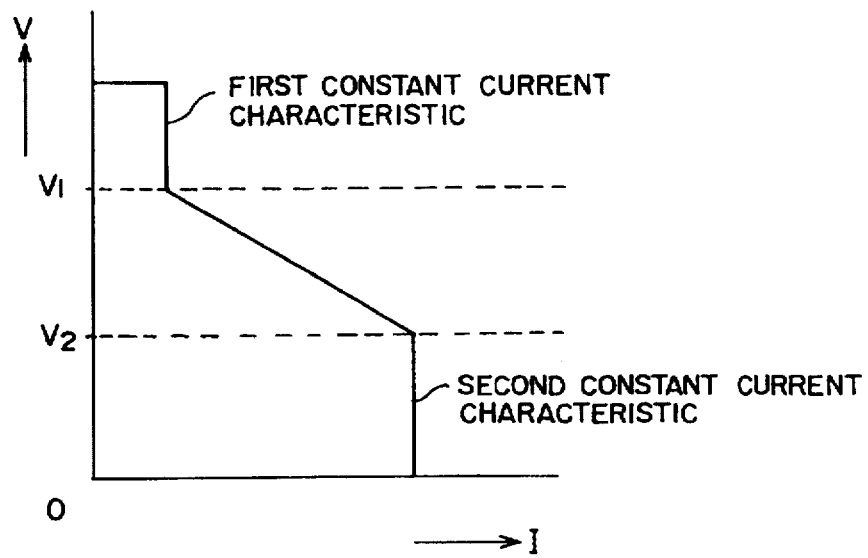
FIG. 2 is a view showing voltage-current characteristic of the first embodiment shown in FIG. 1.

FIG. 1 is an electric circuit diagram showing, partially in a block form, a first embodiment of an engine driven arc welder of this invention, and FIG. 2 is a graph showing power characteristic curve in which arc current I is taken on the abscissa and arc voltage V is taken on the ordinate.

A generator 2 for welding is connected to an engine 1. An output from the welding generator 2 is rectified by a rectifier 3. Then, by a smoothing capacitor 4, an output of the rectifier 3 is caused to be power having low impedance even when high speed operation of transistor is carried out. Reference numeral 5 denotes a switching transistor for performing ON/OFF operation at higher frequency and by large current, reference numeral 6 denotes a reactor for suppressing sudden increase or decrease of current to smooth an output caused to undergo switching by switching transistor 5, thus to stabilize the welding condition, reference numeral 9 denotes a freewheeling (fly-back) diode circuit section for forming a closed circuit including reactor, arc and freewheeling diode for maintaining arc current when switching transistor 5 is in OFF state. Reference numerals 7, 8 denote an output (welding) terminal, and reference numeral 10 denotes a current detector for detecting a current at the welding terminal.

Reference numeral 11 denotes a switching element drive section for controlling switching transistor 5, and reference numeral 12 denotes a comparison control circuit for comparing a reference voltage at the point A and an output voltage signal of current detector 10 to send a signal to switching element drive section 11 so that they have the same voltage. Reference numeral 13 denotes a reference voltage source for delivering reference voltage to the point A, which is supplied with power from winding wound within generator 2 to form an output of a predetermined voltage, reference numeral 14 denotes a variable resistor for changing an output voltage signal of current detector 10 to arbitrarily adjust set current (output voltage), and $D_1$ denotes a rectifying diode. Among them, the circuit between output terminal 7 and comparison control circuit 12 is a current increase circuit for increase-controlling welding current. It is to be noted that reference voltage source 13 may be supplied with power from between smoothing capacitor 4 and switching transistor 5, or from battery (not shown).

Since the engine driven arc welder of this embodiment is constructed as above, an output of welding generator 2 is provided, by operation of the engine, across output terminals 7, 8 via rectifier 3, smoothing capacitor 4, switching transistor 5 and reactor 6. When an operator starts welding work by using output terminals 7, 8, current detector 10 detects welding current to output voltage signal to send it to comparison control circuit 12. This comparison control circuit 12 compares a reference voltage obtained by dividing, by using resistors $r_4$ and $r_5$, a voltage delivered from reference voltage source 13 and the voltage signal to send a signal to switching element drive section 11 so that the both values take the same voltage to thereby carry out constant current control so that set value is kept at all times. In such a state, welding work is continued.

Moreover, this set voltage can be arbitrarily changed by manually operating variable resistor 14. The variable resistor 14 is not directed to vary the welding voltage but to adjust the welding current. At this time, comparison control circuit 12 has, as reference voltage, a voltage at the point A obtained by dividing output voltage of reference voltage source 13 by resistors $r_4$ and $r_5$. When voltage across output terminal 7 and earth is higher than $V_1$ of FIG. 2, a voltage obtained by dividing its voltage by resistors $r_1$ and $r_2$ is delivered to rectifying diode $D_1$ and amplifying transistor $Tr_1$. For this reason, amplifying transistor $Tr_1$ is in conductive state, so a current passing through resistor $r_4$, amplifying transistor $Tr_1$ and resistor $r_3$ flows from reference voltage source 13. Thus, since voltage drop at resistor $r_4$ becomes large by this current, voltage at the point A becomes lower than a voltage divided by resistors $r_4$, $r_5$. Thus, lower reference voltage is delivered to comparison control circuit 12 to form a first constant current characteristic in the load voltage range above $V_1$ as indicated by the graph of FIG. 2 (since resistance values of resistors $r_1$, $r_2$, $r_3$ are set so that potential at the point A hardly changes in the range from no-load to V1, the power characteristic in the range above $V_1$ becomes substantially constant current characteristic.).

On the other hand, the power characteristic in the load voltage range lower than $V_1$ is as follows. Namely, when an operator shortens the distance between welding rod and base metal during welding work to thereby shorten the arc length, or droplet of the welding rod is developed so that the distance therebetween is narrowed, so arc length is similarly shortened, the arc voltage is lowered. Accordingly, voltage across output terminal 7 and earth is proportionally lowered. When voltage $V_1$ is set to a value in the vicinity of arc voltage as shown in FIG. 2, a voltage delivered to amplifying transistor $Tr_1$ is also lowered by the voltage proportionally lowering. For this reason, conductive resistance of amplifying transistor $Tr_1$ becomes large and voltage drop of resistor $r_4$ becomes small. Accordingly, potential at the point A is elevated. Further, arc voltage across output terminals 7 and 8 drops. When amplifying transistor $Tr_1$ is hardly placed in conductive state, voltage at the point A becomes equal to a voltage obtained by dividing voltage of reference voltage source 13 only by resistors $r_4$, $r_5$, resulting in a second constant current power supply characteristic in the load voltage range below $V_2$ of FIG. 2. The characteristic between voltage $V_1$, $V_2$ becomes drooping characteristic curve because voltage at the point A gradually rises.

By preparing a power supply characteristic as shown in FIG. 2 by using the above-mentioned circuit, arc length between output terminals becomes short. Accordingly, even if output terminals are inadvertently short-circuited, the welding rod is difficult to fix to base metal because welding current increases. Further, because there is drooping characteristic in the above-mentioned power supply characteristic, a current is increased when droplet is developed, and fusing of the welding rod is hastened. Accordingly, shift to base metal of droplet becomes smooth. As a result, welding work is easily conducted, and skillfulness is not required.

In addition, in the case of welding carried out in the state where arc length is shortened, such as, for example, welding using high cellulose system covered welding rod or standing welding, etc., there is no arc break and welding quality is high. Thus, welding work is extremely facilitated.

In the engine driven arc welder of the first embodiment, when there is employed an approach to gradually increase current in dependency upon drooping characteristic curve from the first set current to allow a value which is 2.5 times greater than the first set current value to second set current value, this is very effective. Particularly, when high cellulose system covered welding rod is used, it is possible to carry out stable welding work.

As is explained above, in accordance with the engine driven arc welder of the first embodiment, in welding of a fixed current in a lower voltage range, even if arc length between output terminals is shortened, it is possible to carry out stable welding without causing welding defect. Also at the time of re-arc, it is possible to obtain sufficient current. Accordingly, finished state of welding is complete. Also in use of high cellulose system covered welding rod frequently used in foreign products, excellent effect can be exhibited.

Figure 4:
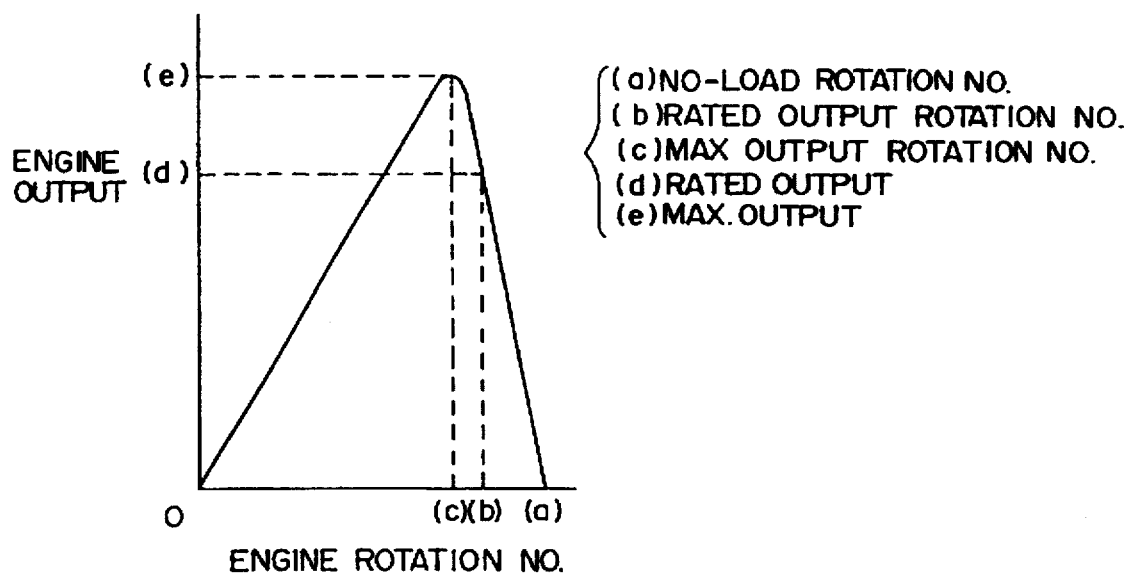
FIG. 4 is a characteristic diagram showing the relationship between engine output and engine rotation number in the second embodiment shown in FIG. 3.
Figure 3:
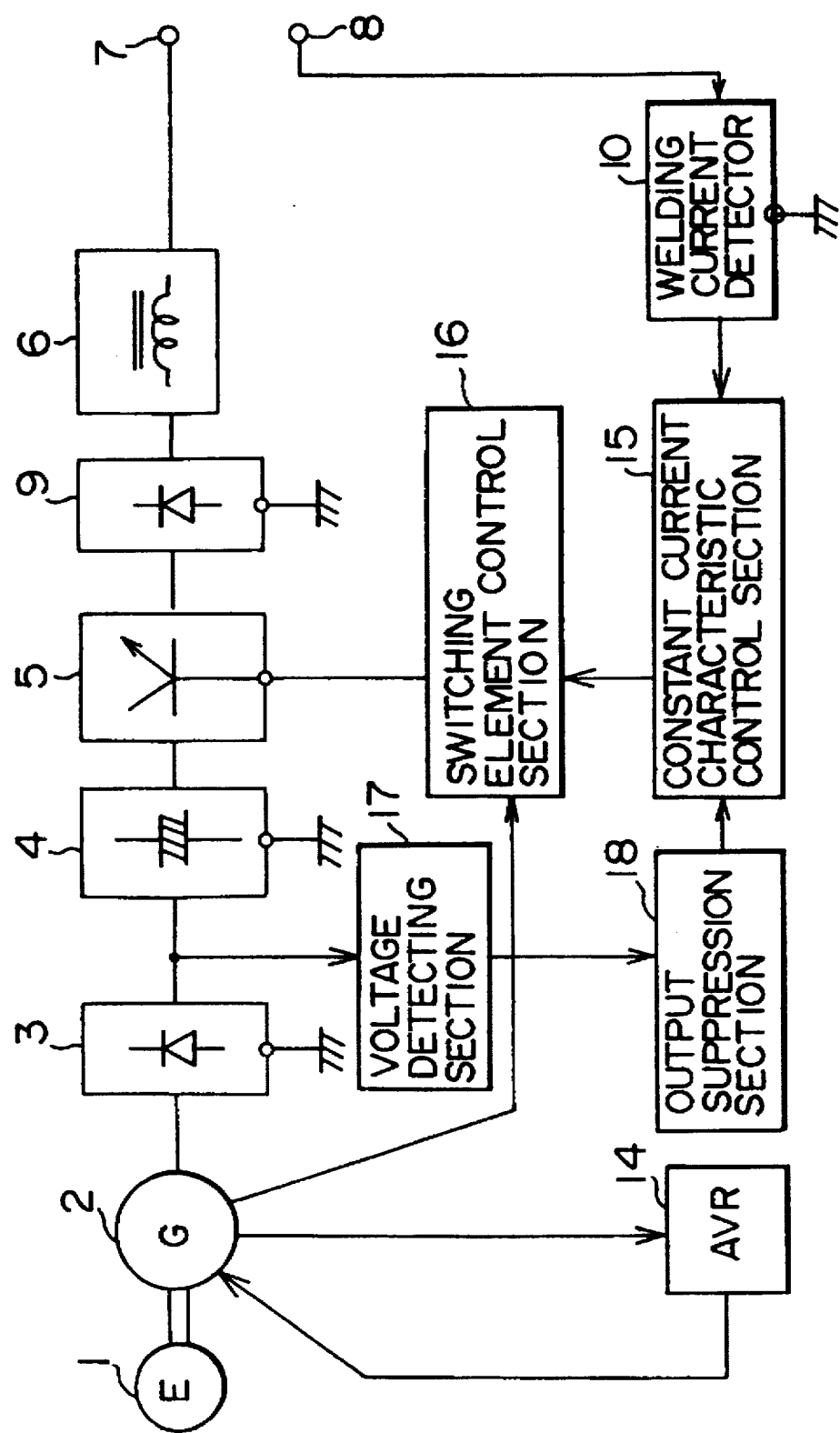
FIG. 3 is a block diagram showing the configuration of a second embodiment according to this invention.
Figure 5:
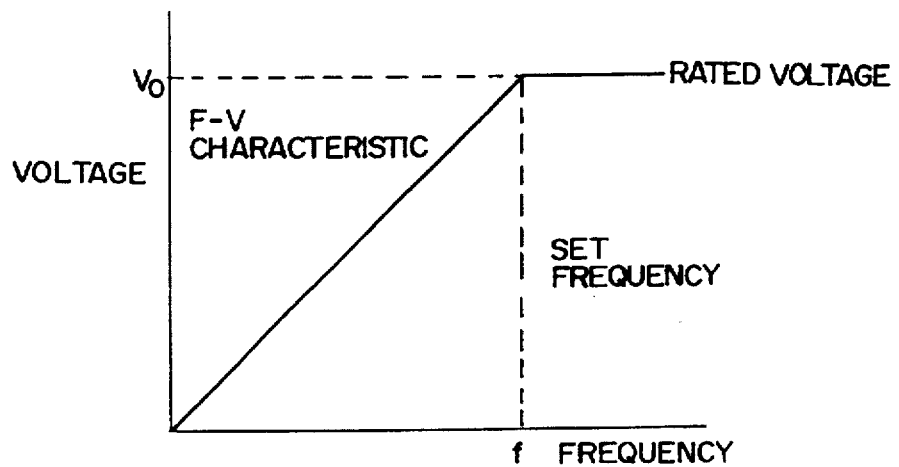
FIG. 5 is a view showing frequency-voltage characteristic of automatic voltage regulating circuit 14 in the second embodiment of FIG. 3.
Figure 6:
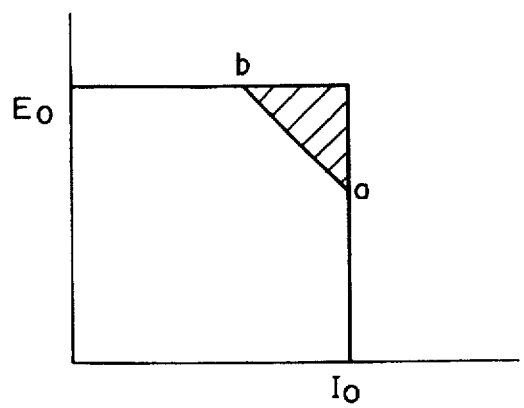
FIG. 6 is a view showing voltage-current characteristic of the second embodiment shown in FIG. 3.
Figure 7:
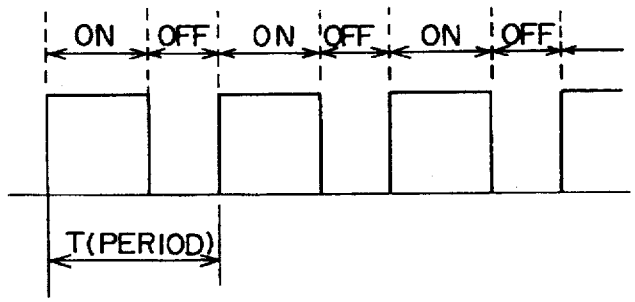
FIG. 7 is a view showing switching waveform of switching element 5 in the second embodiment shown in FIG. 3.

FIG. 3 is a block diagram showing a second embodiment of an engine driven arc welder with load limiting function according to this invention. FIG. 4 is an engine output-rotation number curve showing the relationship between engine output and engine rotation number. FIG. 5 shows FV characteristic curve of an automatic voltage regulating circuit. FIG. 6 shows a welding output characteristic according to this embodiment (slanting portion is excluded from the effective region). FIG. 7 shows ON/OFF operation of switching element.

Welding generator 2 is connected to engine 1. The welding generator 2 is regulated by automatic voltage regulating circuit (AVR) 14 so that output voltage of generator is fixed. A.C. power by welding generator 2 is rectified into d.c. by rectifier 3. The rectifier output is smoothed by capacitor 4. Reference numeral 5 denotes switching element which carries out ON/OFF operation, reference numeral 6 denotes reactor, reference numeral 9 denotes freewheeling diode (fly-back diode) for maintaining arc, and reference numeral 10 denotes a welding current detector. Automatic voltage regulating circuit 14 has FV characteristic such that in the case where frequency of a.c. output of welding generator 2 is lowered to a value less than fixed frequency, output voltage of generator is lowered. Voltage detecting section 17 is connected to d.c. power supply section which has rectified a.c. power from welding generator 2. This detecting section 17 sends a detected voltage to output suppression section 18. When a detected voltage is less than a certain set voltage, the output suppression section 18 sends an output suppression signal proportional to lowering of voltage to constant current characteristic control section 15. At this time, voltage detecting section 17 may detect a.c. output voltage of welding generator 2. In addition, welding current detector 10 is also connected to constant current characteristic control section 15.

Winding for delivering drive power to switching element drive section 16 is wound on stator of welding generator 2. Namely, there is provided a configuration to control switching element drive section 16 by control signal from constant current characteristic control section 15 thus to allow switching element 5 to be turned ON or OFF.

Since the engine driven arc welder of this embodiment is constructed as above, when voltage is applied across welding output terminals 7, 8 to start welding work, its welding current is detected by welding current detector 10. Thus, constant current characteristic control section 15 becomes operative so that the detected welding current is always in correspondence with set current to control switching element drive section 16 to adjust ON period of switching element 5 so that a fixed current is provided.

The relationship between engine output and engine rotation number has a characteristic (governer characteristic) as shown in FIG. 4. It is now assumed that the engine is carrying out no-load operation and its rotation number is no-load rotation number (a). When load is applied to engine 1, the engine governer attempts to maintain rotation number with increase of load, but the engine rotation number is lowered by the characteristic. Thus, that engine rotation number is lowered to maximum output rotation number (c) through rated output rotation number (b). When load is further applied to the engine 1 so that there results overload state, the engine rotation number is lowered from the point (c) and the engine output is also lowered. In the case where the welding output has been placed in overload state by making use of the characteristic, when the engine rotation number is lowered, and frequency of a.c. power supply voltage of the welding generator directly coupled to the engine is also lowered, so that frequency is lowered to less than frequency set in advance, power supply voltage of the welding generator is lowered by the FV characteristic of the automatic voltage regulating circuit 14. That voltage is detected by voltage detecting section 17 to send detected voltage to output suppression section 18. In the case where the detected voltage is lower than a voltage set in advance within the output suppression section 15, an output suppression signal is given to constant current characteristic control section 15 so as to suppress welding output. Thus, switching element drive section 16 is controlled to shorten ON period of switching element 5 which performs operation shown in FIG. 7 in dependency upon lowering of voltage. Thus, welding output point is moved from a to b in the output characteristic without outputting overload region (slanting line portion) of FIG. 6.

Thus, engine 1, welding generator 2, rectifier 3 and capacitor 4, etc. can become compact without requiring those components to have high performance.

Moreover, since a method of limiting the welding output leads to monitoring of engine rotation number, the engine can be rotated in reasonable state without excessively lowering rotation number of the engine. Thus, performance of the engine can be sufficiently exhibited and durability of the engine can be improved.

Further, when welding work is not carried out, slow down function to lower rotation number of the engine is generally adopted in the engine driven arc welder. If current regulator is set so that a welding current is equal to a value in the vicinity of welding maximum output current in the state where this invention is not adopted, in the case where welding work is started from the time of slow down rotation and arc takes place, the constant current characteristic control section becomes operative to attempt to momentarily output set maximum welding current, but the engine output is placed in insufficient state for load condition because rotation number of the engine is not high. For this reason, it is unable to shift rotation of the engine at higher speed. This might be problem in use. However, in fact, such problem does not constitute hinderance for the reason described below. Namely, when rotation number of the engine is in lowered state, welding output is suppressed. Accordingly, it is possible to start welding in the state where the engine rotation number is low irrespective of set welding current condition to securely shift engine rotation at higher speed without giving burden on the engine even if arc takes place.

Figure 8:
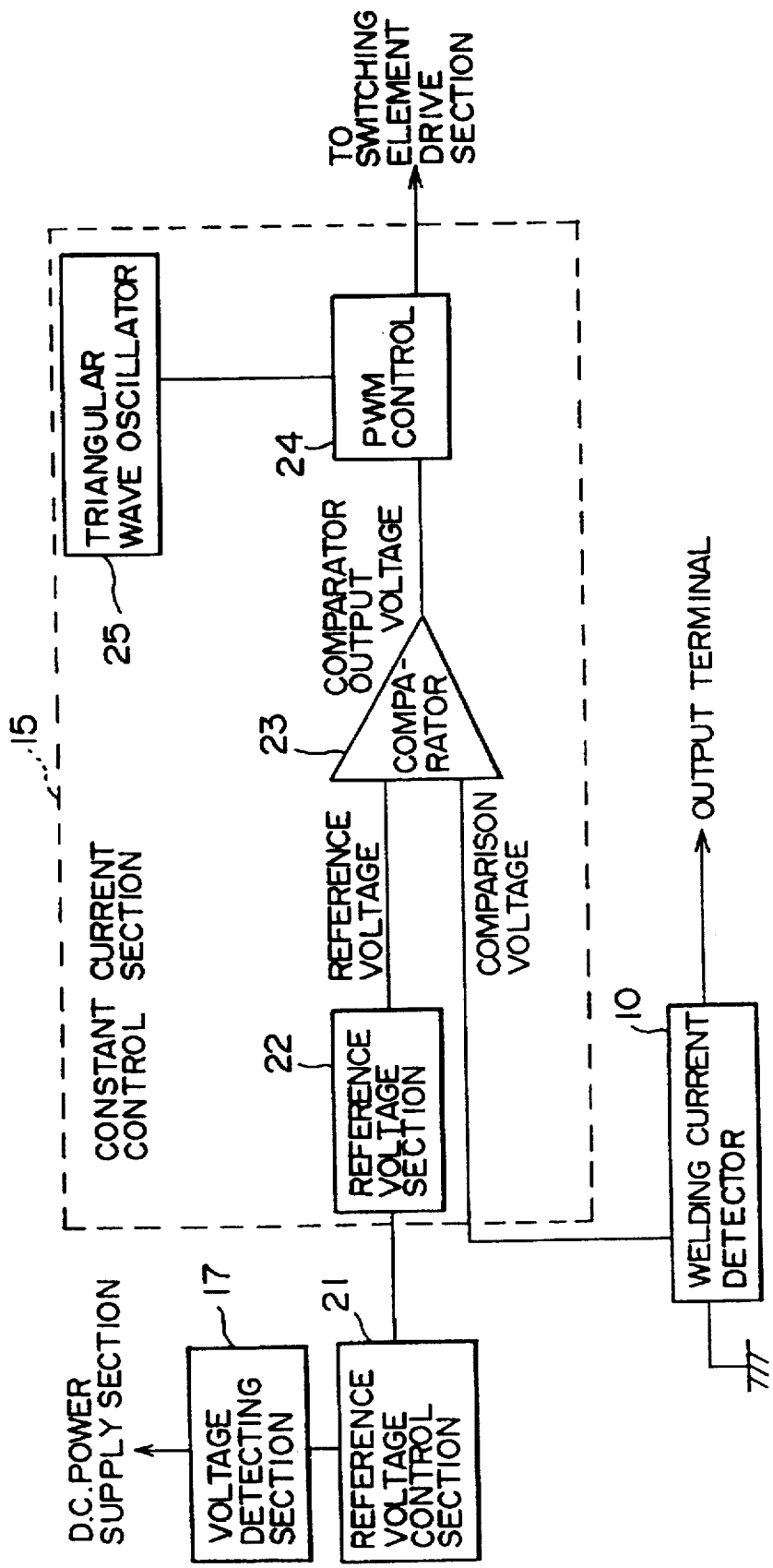
FIG. 8 is a block diagram showing the internal configuration of constant current control section 15 and configuration related thereto in the second embodiment of FIG. 3.
Figure 9:
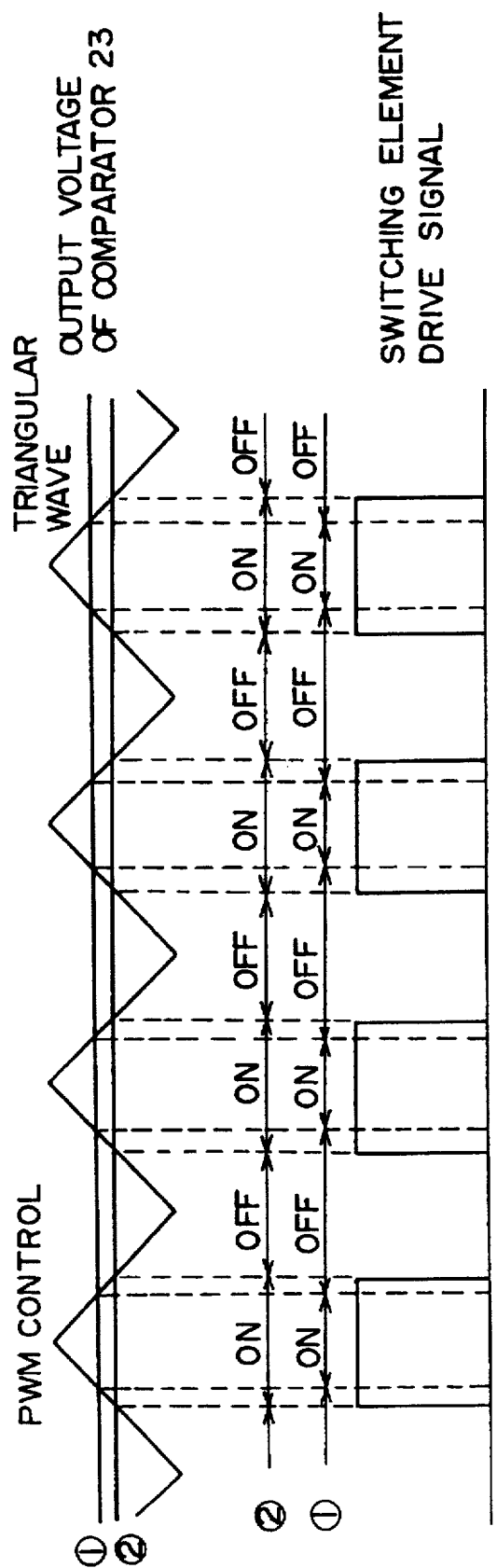
FIG. 9 is a waveform diagram showing the operation of PWM control circuit 24 in constant current control section 15 shown in FIG. 8.
Figure 10:
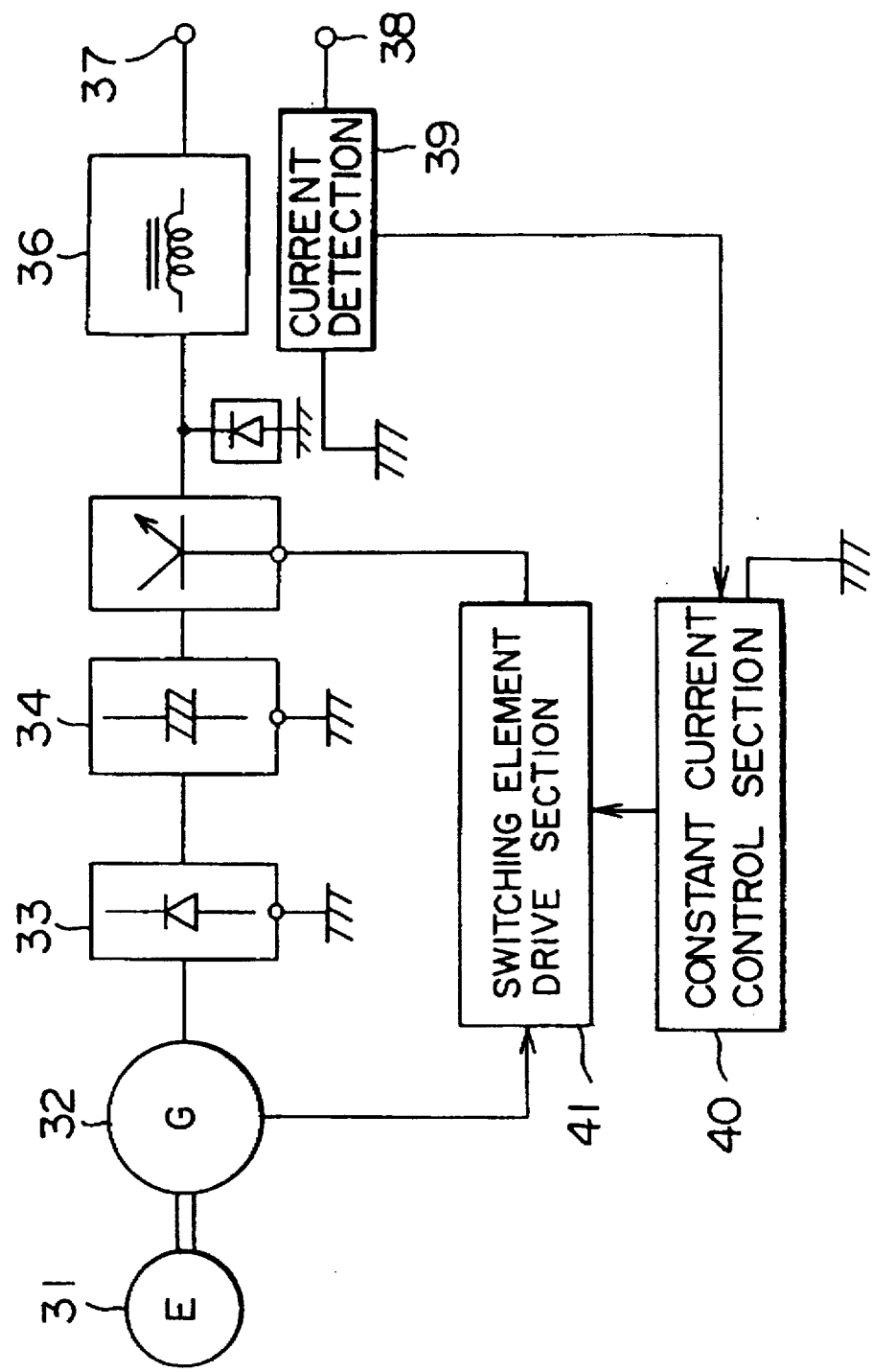
FIG. 10 is a view showing the configuration of a conventional engine driven arc welder.

In the circuit of FIG. 8, when the welder is in ordinary operation, welding current is detected by welding current detector 10 to convert it into a comparison voltage proportional to welding current to compare that comparison voltage with reference voltage at comparator 23. As a result, if welding current is less than set current, comparison voltage is lower than reference voltage. Thus, comparator 23 of FIG. 8 outputs output voltage in a direction to shift downwardly the output voltage level from (1) to (2) of FIG. 9. As a result, the point intersecting with triangular wave is lowered. Thus, ON period is prolonged. In contrast, if welding current is greater than set current, comparison voltage also becomes higher. Accordingly, output voltage of comparator 23 also becomes higher, so ON period is also shortened. Thus, the comparator 23 operates so that reference voltage and comparison voltage are caused to be in correspondence with each other. Thus, there results fixed current control, i.e., constant current control.

Assuming now that there results overload state, the engine rotation number is lowered. As a result, AVR becomes operative so as to exhibit FV characteristic therewithin, thus lowering voltage of generator. Voltage detecting section 17 detects that voltage to send detected voltage to reference voltage control section 21 to compare it with voltage set within reference voltage control section 21. If this detected voltage is low, a signal to shift downwardly the level of reference voltage is sent to reference voltage section 22. As a result, that signal is outputted as a new reference voltage. Reference voltage outputted from reference voltage section 22 is inputted to comparator 23 together with comparison voltage proportional to welding current, at which they are compared with each other. When reference voltage is lowered, comparator 23 outputs output voltage in a direction to shift upwardly its level to shorten ON period of FIG. 9 (direction from (2) to (1)). For this reason, welding current is decreased and load of the engine is also decreased. Accordingly, engine rotation number is increased for a second time, so the generator voltage is also increased. For this reason, the generator attempts to provide an output to allow the engine to be in overload state, but the engine rotation number is lowered for a second time at this time. Accordingly, welding output and engine output are balanced so that they take a fixed value. In FIG. 8, reference numeral 24 denotes a PWM control section, and reference numeral 25 denotes a triangular wave oscillator.

Even if attempt is made to further increase load from this state, because the degree of overload is increased, engine rotation number is greatly lowered and generator voltage is also lowered, thus lowering reference voltage by a value corresponding thereto. Values in the equilibrium state of welding output and engine output at this time are the same value. The welding output characteristic passes through line connecting a and b of FIG. 6. This line resultantly represents constant power characteristic expressed as E×I=constant.

Namely, output above the constant power characteristic represents overload state, and corresponds to slanting line portion of FIG. 6.

As stated above, welding output characteristic according to this embodiment depicts output characteristic except for slanting line of FIG. 6 and limits load so that there results no overload state.

What is claimed is:

1. An engine driven arc welder comprising:

an engine;

a generator for welding driven by said engine to form an a.c. output;

an automatic voltage regulating circuit for regulating an a.c. output voltage of said welding generator so that it becomes equal to a fixed value;

a rectifying circuit for converting the a.c. output of said welding generator into a d.c.;

a switching circuit for allowing the d.c. outputted from said rectifying circuit to undergo switching control to output a switching-controlled output to welding terminals;

a current detector for detecting an output current of said switching circuit;

a constant current control circuit for applying a control signal to said switching circuit in response to the detected current of said current detector to control the ON-period of said switching circuit such that an output current at said welding terminal becomes equal to a fixed value, and to conduct output control in response to a second control signal;

a frequency detecting circuit for detecting frequency of the a.c. output of said welding generator;

a frequency-voltage characteristic circuit for controlling said welding generator so as to output a voltage of a fixed value when a detected frequency of said frequency detecting circuit is a predetermined value or more, and a voltage proportional to frequency when that detected frequency is less than the predetermined value;

a generator output voltage detecting circuit for detecting an output voltage of said welding generator; and an output suppression circuit for comparing a detected voltage of said generator output voltage detecting circuit with a reference voltage set in advance to deliver, when the detected voltage is lower than the reference voltage, the second control signal to said constant current control circuit, thus to suppress an output voltage across said welding terminals.

2. An engine driven arc welder as set forth in claim 1, wherein said switching circuit is constituted by using transistor.

3. An engine driven arc welder as set forth in claim 1, wherein said constant current control circuit carries out pulse width modulation for the purpose of suppression-controlling the length of ON period in said switching circuit.

* * * * *